United States Patent
Zörnack et al.

(10) Patent No.: US 8,651,565 B2
(45) Date of Patent: Feb. 18, 2014

(54) CARRIER ELEMENT FOR A MOTOR VEHICLE

(71) Applicants: Markus Zörnack, Dortmund (DE); Stephan Drewes, Moenchengladbach (DE); Lothar Patberg, Moers (DE)

(72) Inventors: Markus Zörnack, Dortmund (DE); Stephan Drewes, Moenchengladbach (DE); Lothar Patberg, Moers (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

(21) Appl. No.: 13/652,151

(22) Filed: Oct. 15, 2012

(65) Prior Publication Data

US 2013/0062912 A1     Mar. 14, 2013

Related U.S. Application Data

(63) Continuation of application No. PCT/EP2011/055445, filed on Apr. 7, 2011.

(30) Foreign Application Priority Data

Apr. 16, 2010 (DE) .......... 10 2010 016 474

(51) Int. Cl.
    *B62D 25/00*     (2006.01)
(52) U.S. Cl.
    USPC ............ 296/205; 296/209; 296/203.03

(58) Field of Classification Search
    USPC ............... 296/209, 204, 205, 203.03
    See application file for complete search history.

(56) References Cited

U.S. PATENT DOCUMENTS

| | | | |
|---|---|---|---|
| 7,481,485 B2 * | 1/2009 | Ma et al. .......... | 296/187.12 |
| 2008/0309113 A1 | 12/2008 | Baudart | |

FOREIGN PATENT DOCUMENTS

| | | |
|---|---|---|
| DE | 43 00 398 A1 | 7/1994 |
| DE | 195 05 364 A1 | 8/1996 |
| DE | 197 56 459 A1 | 6/1999 |
| DE | 10 2004 010 581 A1 | 9/2005 |
| DE | 10 2004 033 971 A1 | 2/2006 |
| DE | 10 2009 017 297 A1 | 11/2009 |
| DE | 10 2009 043 022 A1 | 3/2011 |
| FR | 2 881 393 A1 | 8/2006 |
| WO | WO 2009/112407 A1 | 9/2009 |

* cited by examiner

*Primary Examiner* — Joseph Pape
(74) *Attorney, Agent, or Firm* — Reinhart Boerner Van Deuren P.C.

(57) ABSTRACT

The invention relates to a carrier element for a motor vehicle made of steel, which comprises at least one closed cross-sectional area and at least one rolled profile produced from a tailored strip, which extends in longitudinal direction of the carrier element. In addition to this, the invention relates to a body of a motor vehicle. The object of making available a carrier element for a motor vehicle that cannot only be produced in a simple manner and can provide high strengths with same manufacturing costs is solved in that through the rolled profile a carrier element having at least one at least partially closed cross-sectional area is formed.

8 Claims, 3 Drawing Sheets

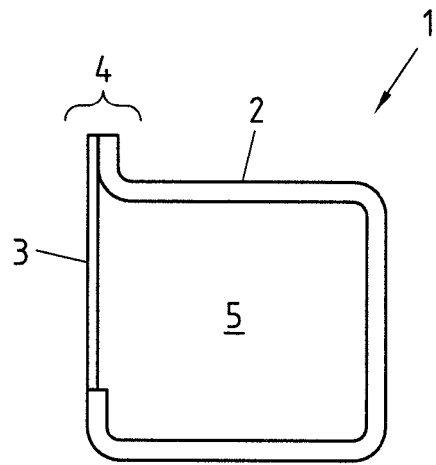
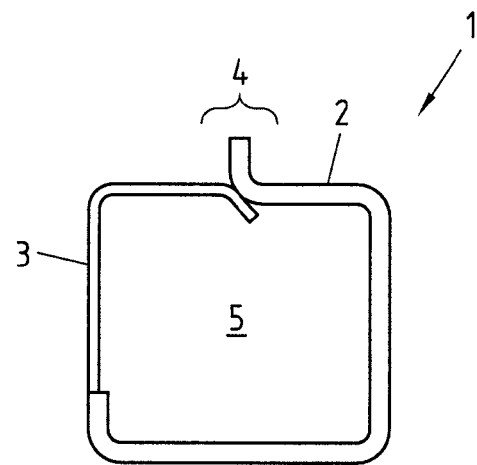
Fig.1a Prior Art
Fig.1b Prior Art
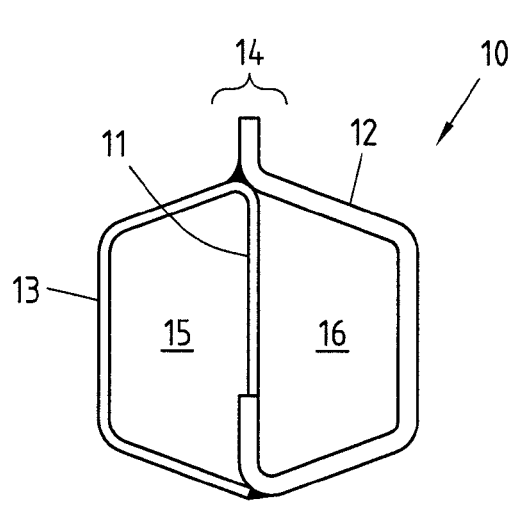
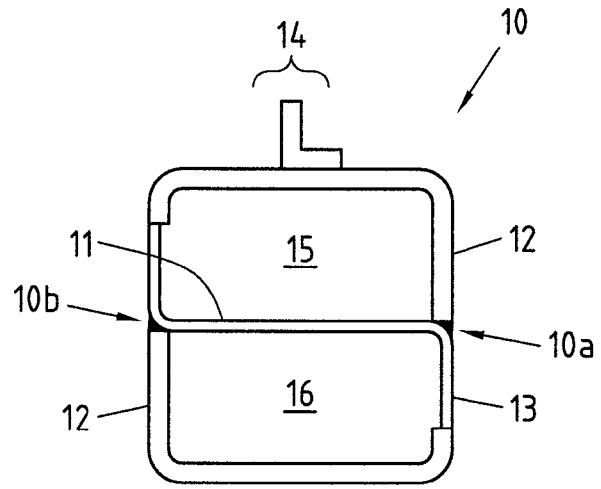
Fig.2a
Fig.2b

CARRIER ELEMENT FOR A MOTOR VEHICLE

CROSS-REFERENCE TO RELATED PATENT APPLICATIONS

This patent application is a continuation of PCT/EP2011/055445, filed Apr. 7, 2011, which claims priority to German Application No. 102010016474.7, filed Apr. 16, 2010, the entire teachings and disclosure of which are incorporated herein by reference thereto.

FIELD OF THE INVENTION

The invention relates to a carrier element for a motor vehicle made of steel, which at least partially comprises a closed cross-sectional area and at least one rolled profile produced from a tailored strip, which extends in longitudinal direction of the carrier element. In addition to this, the invention relates to a body of a motor vehicle.

BACKGROUND OF THE INVENTION

It is known to produce carrier elements of a motor vehicle from tailored blanks, i.e. from plates specifically adapted to the load situation. To this end, plates of different material qualities and/or thicknesses are welded together into tailored blanks and subsequently formed for example into half shells for producing carrier elements. Carrier elements, which utilise rolled profiles produced from tailored strips, are known for example from the German disclosure publication DE 10 2009 017 297 A1. Tailored strips are metal strips which are connected lengthwise, i.e. welded to at least one further metal strip, so that these form a common metal strip. The welded metal strips can consist of different material qualities, for example of soft and high-strength steels, in order to be used for producing components that are designed to suite the load. In addition to this, it is also possible by using different material thicknesses to satisfy the load situation of the component produced from the tailored strip. By comparison to the use of tailored blanks for producing carrier elements, the singling-out and the cutting to size of plates and the involved welding of the individual cuttings are not required with tailored strips. From the abovementioned German disclosure publication a carrier element in the form of a door sill of a motor vehicle is known, wherein the carrier element consists of two shells, wherein at least one of the two shells is produced from a tailored strip. The half shell produced from the tailored strip can make available a connecting region in the door sill so that an outer panelling in this region can be fastened in a simple manner. On the other hand, at least two joining steps, namely through joining the two shell sides to be connected are required with the shell-like construction of the door sill. On the other hand, the known door sill is worthy of improvement with respect to its stiffness and its strength.

From the German disclosure publication DE 197 56 459 A1 a carrier of a motor vehicle formed by rolling is known, which was produced from a tailored strip with different material qualities/thicknesses.

SUMMARY OF THE INVENTION

Starting out from this, the object of the present invention is making available a carrier element for a motor vehicle, which can be produced in a simple manner and can provide high strengths with same production costs and low weight.

The object is solved through a carrier element having the features of Patent Claim 1.

Initially, a carrier element having at least one at least partially closed cross-sectional area is formed through the rolled profile.

According to the mentioned prior art, a closed cross-sectional area for the carrier element is already provided from the rolled profile alone, so that a shell design of the carrier element can be omitted. Two shells are not required, but a carrier element having an at least partially closed cross-sectional area is produced from a tailored strip. Accordingly, the carrier element forms an at least partially closed hollow profile and in the simplest case merely consists of the rolled profile. The carrier element produced from a tailored strip, ensures that the material thicknesses and material qualities provide the necessary stiffness and strength of the carrier element corresponding to the load situation. The carrier element can for example have a single weld seam, for example in the case of a carrier element produced from a rolled profile with a square cross-sectional area. The production costs can be lowered yet again compared to the shell design with same strength characteristics.

According to the invention, the rolled profile forms at least one middle web at least partially extending in longitudinal direction in the interior of the carrier element so that altogether the strength and stiffness of the carrier element can be significantly increased. The carrier element with middle web can for example form a type of double chamber profile which has a significantly higher strength. According to the invention, the middle web in this case is provided by a material having a lower material thickness in order to reduce the weight growth attributable to the middle web.

According to a first embodiment of the carrier element according to the invention, at least one flange is provided which extends at least partially in longitudinal direction of the carrier element and is optionally formed by the rolled profile. The at least one flange of the carrier element preferentially serves in order to connect further elements to the carrier element. Thus, the flange can be used for example for seals as sealing flange or for connecting an outer panelling. When the flange is formed by the rolled profile an additional assembly of a flange is avoided and the number of the operations for producing the carrier element with flange is reduced. In addition, the material quality or the material thickness of the flange can be adjusted load-specifically via the rolled profile.

In addition to this, preferentially by using a tailored strip for producing the rolled profile, the material quality of the middle web can be freely selected and thus very well adapted to the load situation of the carrier element.

Preferentially, the carrier element is a side member or a door sill of a motor vehicle. Side members and door sills have to frequently withstand high buckling and/or bending loads in the event of an accident and have a specific deformation behaviour. With the carrier element according to the invention, the load situation can be taken into account very precisely with minimal weight of the carrier element through the suitable selection of the tailored strips on the one hand, wherein the operations for producing the carrier element are minimised at the same time. The sealing flange of a door sill can also be made available without any major effort through the rolled profile to be used according to the invention.

If the rolled profile comprises punched holes and/or passages in a region, preferentially in the region of a middle web, the weight of the carrier element can be further reduced without substantially influencing the strength of the carrier element. According to a further embodiment of the carrier element according to the invention, the rolled profile is preferentially produced from a tailored strip, which comprises two, three or more than three different material qualities and/or material thicknesses. As already explained before, the different loads and possible configurations of the carrier element can be taken into account via the material qualities and material thicknesses of the tailored strip without requiring major production effort. In particular with three or more different material qualities and material thicknesses, highly complex load situations can be exactly depicted.

Dependent on the load situation in the motor vehicle, the middle web according to a further embodiment of the carrier element according to the invention runs vertically, horizontally or diagonally to the cross-sectional area of the carrier element in the installed state. All three configurations have advantages dependent on the specific installation situation of the carrier element in the motor vehicle. Thus, it is ensured for example through a horizontal profile of the middle web of the carrier element that in the event of a lateral buckling and/or bending load, for example in the case of a lateral impact, a maximum stiffness is provided. By contrast, a vertical middle web makes possible a highest possible loading of the carrier element in vertical direction. The diagonally running middle web by contrast constitutes a very sound compromise of both load situations and in this respect provides a carrier element that can be subjected to a particularly homogeneous load. Preferentially, the region of the middle web of the rolled profile has a smaller wall thickness than the remaining regions of the rolled profile and/or consists of softer steel quality than the remaining regions of the rolled profile. As a rule, no extremely high stiffness is demanded for the middle web so that here the material thicknesses can be reduced and weight saved. Softer steel qualities additionally make it possible to achieve a targeted deformation behaviour of the carrier element.

According to a next embodiment of the carrier element according to the invention a further profile is additionally provided, which is connected to the rolled profile through material joining and forms an outer wall of the carrier element. By using a further profile for forming an outer wall of the carrier element, geometrical requirements of the carrier element, which for example contradict the stiffness requirements, can be ensured with minimal effort, wherein the rolled profile, produced from a tailored strip, assumes the task of providing the mechanical load requirements. For example, the rolled profile can assume a shape that is unfavourable for the installation of the carrier element in order for example to satisfy the load requirements and via the additional profile, the geometrical requirements regarding the installation of the carrier element. The effort for providing a corresponding carrier element approximately corresponds to that of a carrier element produced in shell design. This approach is particularly effective when the platform for example of a vehicle type is identical and the shape of the profile (outer wall) varies as a function of the vehicle type (estate, coupe, cabrio, etc.).

Finally, the sealing flanges of a door sill according to a further embodiment of the carrier element according to the invention can be provided in that as flange one or two sealing flanges are provided and the sealing flange or flanges are optionally connected to the carrier element via a positive connection. In this case, additional components are needed for the flanges. However, this degree of freedom makes possible to arrange the sealing flanges independently of the choice of the geometrical shape of the rolled profile. If the sealing flanges as already explained are provided by the rolled profile, the effort of attaching the sealing flange is obsolete however.

According to a further teaching of the present invention, the shown object is solved through a body of a motor vehicle having a carrier element according to the invention. As already explained, carrier elements which are cost-effective and adapted to the load situation can be provided, which lead to a corresponding cost reduction of the motor vehicle body.

BRIEF DESCRIPTION OF THE DRAWINGS

In the following, the invention is explained in more detail by means of exemplary embodiments in conjunction with the drawing. The drawing shows in cross-sectional views in FIG. 1a), b) a first exemplary embodiment of a carrier element according to the invention without middle web from the prior art, FIG. 2a), b) two further exemplary embodiments of a carrier element according to the invention with vertical or horizontal middle web, FIG. 3a), b) two further exemplary embodiments with diagonally running middle web and FIG. 4a) to c) three further exemplary embodiments of a carrier element according to the invention with an additional profile.

DETAILED DESCRIPTION OF THE INVENTION

Figure 3A:
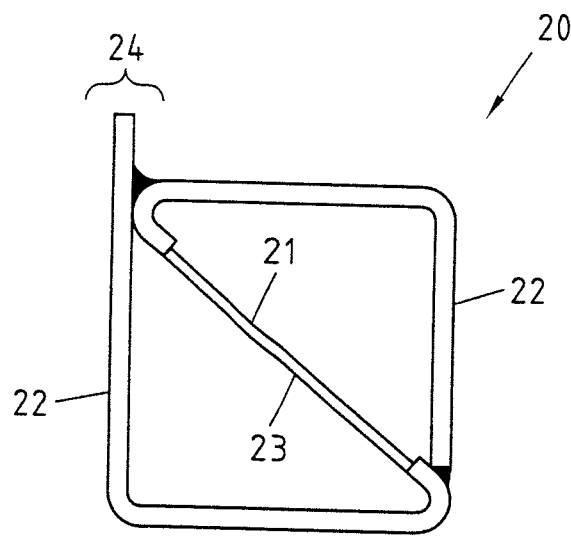
Figure 3B:
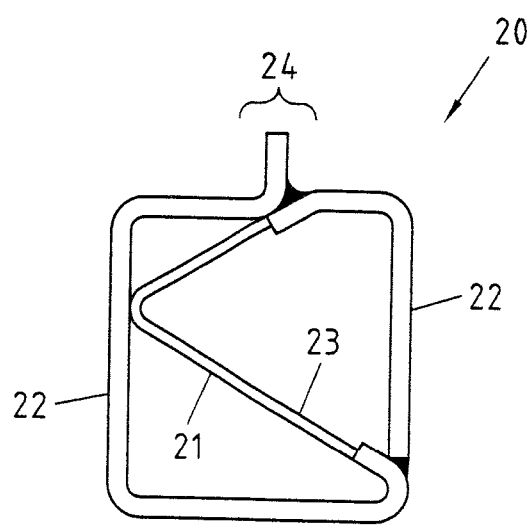
Figure 4A:
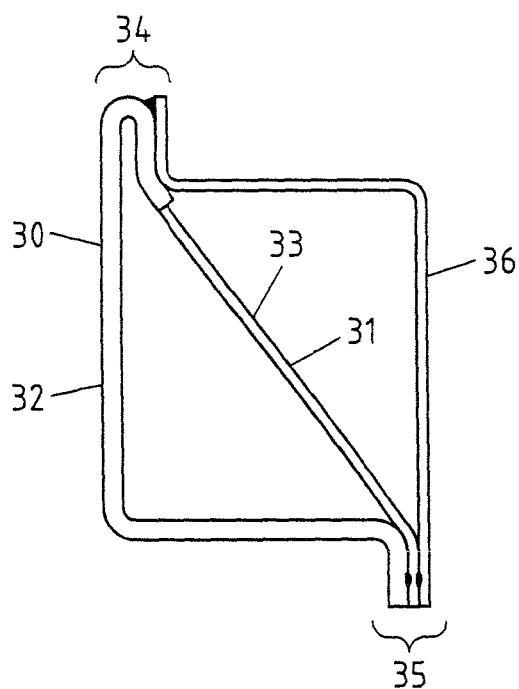
Figure 4B:
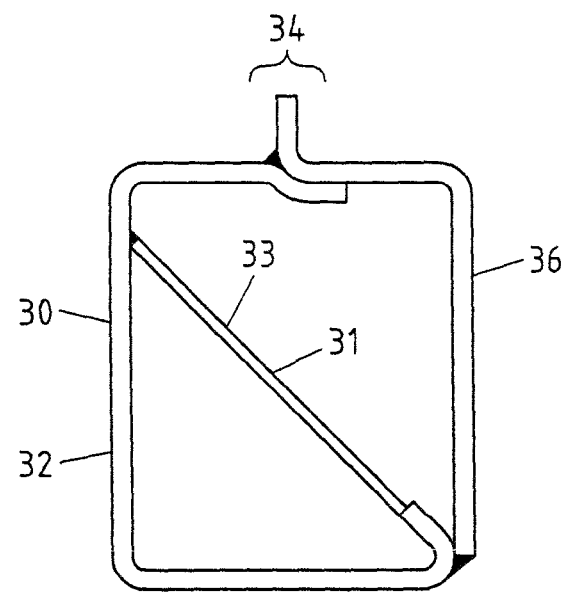
Figure 4C:
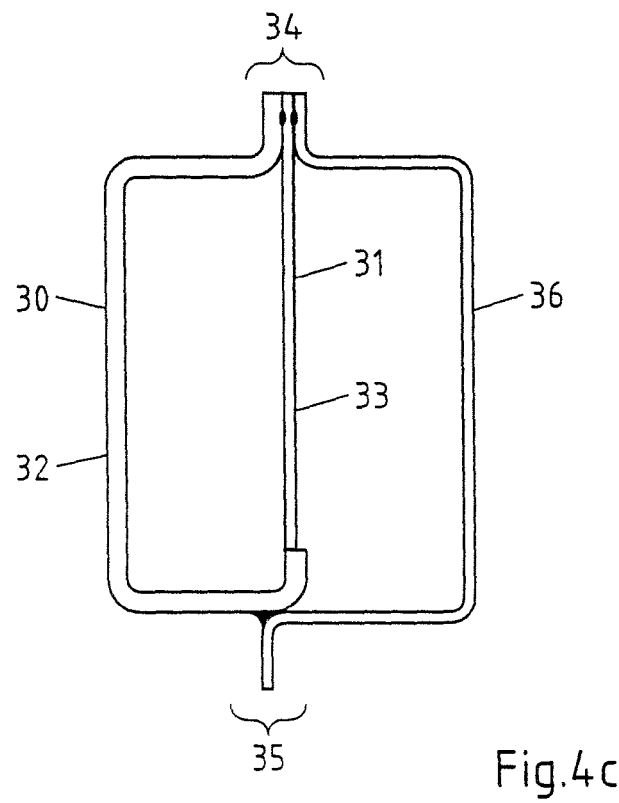

The exemplary embodiments of carrier elements according to the invention shown in the FIGS. 2 to 4 can all be employed as side member or door sill in a motor vehicle.

In FIGS. 1a) and b), two exemplary embodiments of a carrier element from the prior art are shown in a cross-sectional view, wherein the carrier element has a rolled profile 1. The rolled profile 1 in this case consists of two different regions 2 and 3, which, as presented above, have different material thicknesses. The rolled profile 1 is formed into a square, closed cross-sectional area 5 and comprises a flange 4, in which the two regions of the rolled profile 2 and 3 are connected to each other through material joint in order to form the closed cross-sectional area 5. As is evident from FIG. 1a), the rolled profile is produced from a tailored strip, which comprises two different regions 2 and 3, which have different material thicknesses. The different material thicknesses ensure that the carrier element can be optimally adapted to the loads in the installed state. Obviously, it is conceivable in place of different material thicknesses to additionally also choose different material qualities with same or different material thicknesses.

FIG. 1b) shows a second version of the carrier element consisting of a rolled profile, which was roll-profiled into a square cross-sectional shape. Visible are the two regions 2 and 3, which have different thicknesses. The flange 4 in this case is arranged in the middle of the cross-sectional area 5 of the carrier element, which is provided by the rolled profile 1. Producing the rolled profile 1 of the exemplary embodiments from FIGS. 1a) and b) is carried out through roll-profiling a tailored strip consisting of two middle strips having two different material thicknesses of the regions 2 and 3. Obviously, it is conceivable that three or more different material thicknesses and/or material qualities can be provided through the tailored strip.

Not shown in FIGS. 1a) and b) are for example punched holes or passages. These can for example be introduced in the surface of the carrier element facing downwards and form a paint drainage so that these are advantageous in this respect during the painting of the carrier element.

FIGS. 2a) and b) show two exemplary embodiments of a carrier element according to the invention consisting of a rolled profile 10, which provides a middle web 11. The rolled profile 10 consists of two regions 12, 13, which consist of materials having a different material thickness. As is shown in FIG. 2a), the middle web 11 is vertically orientated and consists of a thinner material, so that the weight increase because of the middle web 11 happens to be smaller. In addition to this, the middle web 11 can be equipped with punched holes or passages prior to the roll-profiling, so that a further weight saving is achieved. The middle web 11 guarantees a very high stiffness of the carrier element in vertical direction. The flange 14, which can be used as sealing flange, is already provided through the rolled profile 10 so that additional operations for producing the sealing flange are not required. When using the carrier element shown in FIG. 2a) as door sill in a motor vehicle, the region 12 can for example have a greater material thickness to the outside or to the inside, depending on which deformation requirements are desired in a lateral impact.

A greater lateral strength is obtained in the exemplary embodiment shown in FIG. 2b). Here, too, the carrier element according to the invention consists of a rolled profile 10, which is roll-profiled in such a manner that it forms a middle web 11 and comprises two closed cross-sectional areas 15 and 16. In contrast to the exemplary embodiment in FIG. 2a), the rolled profile 10 is produced from a tailored strip, which comprises a middle region 13 having a smaller material thickness and two outer regions 12 having a greater material thickness. The tailored strip is formed into a rolled profile in such a manner that it has the shape of a double hollow chamber profile. The two edges 10a and 10b of the rolled profile 10 are welded to the middle region 13 of the hollow profile, so that a closed hollow chamber structure is provided. The stiffness of this is huge. The middle web 11 in this case runs horizontally and in this regard can very well accommodate lateral impact forces. The sealing flange 14 is provided as additional component via a materially joined and/or positively joined connection. However, the sealing flange can also be provided via the rolled profile 10.

FIGS. 3a) and b) now shows two further exemplary embodiments of a carrier element of a motor vehicle according to the invention with a diagonally running middle web 21, which is provided out of the region 23 of the rolled profile 20. With both exemplary embodiments, the flange 24 is provided by the rolled profile. In FIG. 3a) the flange 24 is arranged on the margin and in FIG. 3b) the flange is arranged in the middle of the carrier element. Both exemplary embodiments comprise a rolled profile 20, which is produced from a tailored strip having three material regions. The rolled profile 20 comprises two regions 22 having a greater material thickness and a region 23 having a smaller material thickness, which is provided for the middle web 21.

Exemplary embodiments of a carrier element according to the invention that is structured in an even more complex manner is shown by FIG. 4a) to c) likewise in a cross-sectional view. The exemplary embodiments from FIGS. 4a) to 4c) have a rolled profile 30, which is produced from a tailored strip, so that a region 33 with smaller material thickness and a region 32 with greater material thickness is provided. In addition, a further profile 36 is provided, which jointly with the rolled profile 30 imparts the carrier element with an approximately quadrilateral cross-sectional shape, so that geometrical requirements during the installation of the carrier element in the motor vehicle are satisfied. In FIGS. 4a) and 4c) the additional profile 36 jointly with the rolled profile 30 forms two sealing flanges on the margin or in the middle. At the same time, a middle web 31 is made available through the rolled profile 30 in order to increase the stiffness of the carrier element.

In FIG. 4b), merely a sealing flange 34 is provided, which in this case is formed by the additional profile 36. All shown exemplary embodiments have in common that these consist of a rolled profile produced from a tailored strip, which is adapted to suit the loads and with a preferably simple production route satisfies maximum requirements in terms of load and geometry.

The invention claimed is:

1. A carrier element for a motor vehicle made of steel, the carrier element comprising at least a partially closed cross-section area and at least one rolled profile produced from a tailored strip, which comprises at least two different material qualities and/or material thicknesses, which extends in a longitudinal direction of the carrier element, wherein through the rolled profile a carrier element having at least one at least partially closed cross-sectional area is formed, wherein the rolled profile forms a middle web at least partially extending in longitudinal direction in the interior of the carrier element and the region of the middle web of the rolled profile consists of a softer steel quality than the remaining regions of the rolled profile and has a smaller wall thickness than the remaining regions of the rolled profile.

2. The carrier element according to claim 1, wherein at least one flange is provided, which extends at least partially in the longitudinal direction of the carrier element and is optionally formed by a part of the rolled profile.

3. The carrier element according to claim 1, wherein the carrier element is a side member or a door sill of a motor vehicle.

4. The carrier element according to claim 1, wherein the rolled profile comprises punched holes and/or passages at least in a region, preferentially in the region of a middle web.

5. The carrier element according to claim 1, wherein the middle web runs one of vertically, horizontally or diagonally to the entire cross-sectional area of the carrier element in the installed state of the carrier element.

6. The carrier element according to claim 1, wherein a further profile is additionally provided, which is connected to the rolled profile through material joining and forms a wall of the carrier element.

7. The carrier element according to claim 2, wherein the at least one flange comprises one or two sealing flanges and the sealing flange or sealing flanges is/are optionally connected to the carrier element via a joint.

8. A body of a motor vehicle comprising at least one carrier element according to claim 1.

* * * * *